United States Patent
Wright (10) Patent No.: US 9,488,317 B2
(45) Date of Patent: Nov. 8, 2016

(54) LOW OIL LEVEL DETECTION SYSTEM AND METHOD

(71) Applicant: Allison Transmission, Inc., Indianapolis, IN (US)

(72) Inventor: Thomas A. Wright, Noblesville, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 669 days.

(21) Appl. No.: 13/733,529

(22) Filed: Jan. 3, 2013

(65) Prior Publication Data

US 2013/0118593 A1 May 16, 2013

Related U.S. Application Data (63) Continuation of application No. PCT/US2012/043432, filed on Jun. 21, 2012.

(60) Provisional application No. 61/499,889, filed on Jun. 22, 2011.

(51) Int. Cl.
  *F17D 3/00* (2006.01)
  *B60K 6/48* (2007.10)
  *F16H 57/04* (2010.01)
  *F01M 1/12* (2006.01)

(52) U.S. Cl.
  CPC . *F17D 3/00* (2013.01); *B60K 6/48* (2013.01); *F16H 57/0449* (2013.01); *B60K 2006/4825* (2013.01); *F01M 2001/123* (2013.01); *Y02T 10/6221* (2013.01); *Y02T 10/6252* (2013.01); *Y10T 137/0324* (2015.04); *Y10T 137/7303* (2015.04)

(58) Field of Classification Search
  CPC ............... F01M 2001/123; F01M 2001/0215; F04B 23/00; F04B 49/20
  See application file for complete search history.

(56) References Cited

U.S. PATENT DOCUMENTS

| | | |
|---|---|---|
| 2,012,082 A | 8/1935 | Hieber et al. |
| 2,374,822 A | 5/1945 | Claire |
| 2,759,608 A | 8/1956 | Miller |
| 3,025,718 A | 3/1962 | Christenson |

(Continued)

FOREIGN PATENT DOCUMENTS

| | | |
|---|---|---|
| DE | 3519026 | 4/1986 |
| DE | 10 2005 015911 A1 | 10/2006 |

(Continued)

OTHER PUBLICATIONS

European Search Report dated Oct. 8, 2014 EP12802017.9.

(Continued)

*Primary Examiner* — Patrick Hamo
(74) *Attorney, Agent, or Firm* — Woodard Emhardt Moriarty McNett & Henry LLP (57) ABSTRACT

A hydraulic system for a hybrid module which is located between an engine and a transmission includes a parallel arrangement of a mechanical pump and an electric pump. Each pump is constructed and arranged to deliver oil from a sump to other portions of the hydraulic system depending on the operational mode. A load on the electric pump corresponds to a current draw on the electric pump motor. This current draw is used to indicate when there is a low oil level in the sump.

22 Claims, 6 Drawing Sheets

(56) References Cited

U.S. PATENT DOCUMENTS

| | | |
|---|---|---|
| 3,334,705 A | 8/1967 | Lam |
| 3,800,913 A | 4/1974 | Schmitt |
| 3,863,739 A | 2/1975 | Schaefer et al. |
| 4,584,487 A | 4/1986 | Hesse et al. |
| 4,838,126 A | 6/1989 | Wilfinger et al. |
| 5,019,757 A | 5/1991 | Beifus |
| 5,121,714 A | 6/1992 | Susa et al. |
| 5,209,110 A | 5/1993 | Sano et al. |
| 5,217,085 A | 6/1993 | Barrie et al. |
| 5,251,440 A | 10/1993 | Bong-dong et al. |
| 5,347,821 A | 9/1994 | Oltman et al. |
| 5,362,206 A | 11/1994 | Westerman et al. |
| 5,415,603 A | 5/1995 | Tuzuki et al. |
| 5,447,414 A | 9/1995 | Nordby et al. |
| 5,606,946 A | 3/1997 | Data et al. |
| 5,669,464 A | 9/1997 | Earleson |
| 5,724,878 A | 3/1998 | Stolle et al. |
| 5,736,823 A | 4/1998 | Nordby et al. |
| 5,752,482 A | 5/1998 | Roettgen et al. |
| 5,823,282 A | 10/1998 | Yamaguchi |
| 5,895,099 A | 4/1999 | Diecke et al. |
| 5,944,632 A | 8/1999 | Hara et al. |
| 6,082,322 A | 7/2000 | Graham |
| 6,172,602 B1 | 1/2001 | Hasfjord |
| 6,209,672 B1 | 4/2001 | Severinsky |
| 6,244,825 B1 | 6/2001 | Sasaki et al. |
| 6,292,731 B1 | 9/2001 | Kirchhoffer et al. |
| 6,305,664 B1 | 10/2001 | Holmes et al. |
| 6,390,947 B1 | 5/2002 | Aoki et al. |
| 6,527,074 B1 | 3/2003 | Morishita |
| 6,607,142 B1 | 8/2003 | Boggs et al. |
| 6,638,022 B2 | 10/2003 | Shimabukuro et al. |
| 6,647,326 B2 | 11/2003 | Nakamori et al. |
| 6,716,138 B2 | 4/2004 | Matsubara et al. |
| 7,041,030 B2 | 5/2006 | Kuroda et al. |
| 7,055,486 B2 | 6/2006 | Hoff et al. |
| 7,082,758 B2 | 8/2006 | Kageyama et al. |
| 7,117,120 B2 | 10/2006 | Beck et al. |
| 7,168,924 B2 | 1/2007 | Beck et al. |
| 7,174,876 B2 | 2/2007 | Suzuki et al. |
| 7,192,518 B2 | 3/2007 | Roesgen |
| 7,255,214 B2 | 8/2007 | Long et al. |
| 7,285,066 B2 | 10/2007 | Long et al. |
| 7,288,039 B2 | 10/2007 | Foster et al. |
| 7,396,306 B2 | 7/2008 | Long et al. |
| 7,427,914 B2 | 9/2008 | Plantamura |
| 7,481,053 B2 | 1/2009 | Kitano et al. |
| 7,543,695 B2 | 6/2009 | Redelman et al. |
| 7,556,120 B2 | 7/2009 | Sah et al. |
| 7,558,699 B2 | 7/2009 | Beck et al. |
| 7,651,427 B2 | 1/2010 | Long et al. |
| 7,779,958 B2 | 8/2010 | Kitano et al. |
| 7,946,389 B2 | 5/2011 | Kakinami et al. |
| 8,307,626 B2 * | 11/2012 | Sheridan .................. F01D 25/20 184/26 |
| 2002/0177960 A1 | 11/2002 | Berndorfer |
| 2003/0059310 A1 | 3/2003 | Koenig et al. |
| 2004/0062658 A1 | 4/2004 | Beck et al. |
| 2004/0192502 A1 | 9/2004 | Suzuki et al. |
| 2005/0031443 A1 | 2/2005 | Ohlsson et al. |
| 2005/0064975 A1 | 3/2005 | Takagi et al. |
| 2006/0065217 A1 * | 3/2006 | Ikegawa .................. F01M 1/02 123/41.42 |
| 2007/0173373 A1 | 7/2007 | Kinugasa et al. |
| 2007/0240919 A1 | 10/2007 | Carlson |
| 2007/0258827 A1 * | 11/2007 | Gierke .................. F04D 15/029 417/6 |
| 2007/0284176 A1 | 12/2007 | Sah et al. |
| 2008/0017472 A1 | 1/2008 | Redelman et al. |
| 2008/0067116 A1 | 3/2008 | Anderson et al. |
| 2008/0121464 A1 * | 5/2008 | Ledger .................. B60K 6/445 184/6.13 |
| 2008/0260541 A1 | 10/2008 | Lifson et al. |
| 2009/0014245 A1 | 1/2009 | Shevchenko et al. |
| 2009/0107755 A1 | 4/2009 | Kothari et al. |
| 2009/0116155 A1 | 5/2009 | Almalki et al. |
| 2009/0118878 A1 | 5/2009 | Park |
| 2009/0235657 A1 | 9/2009 | Rampen et al. |
| 2009/0247353 A1 | 10/2009 | Tryon et al. |
| 2009/0247355 A1 | 10/2009 | Tryon et al. |
| 2009/0253552 A1 | 10/2009 | Foster |
| 2009/0259381 A1 | 10/2009 | Wilson et al. |
| 2009/0276119 A1 | 11/2009 | Barker et al. |
| 2010/0083730 A1 | 4/2010 | Le et al. |
| 2010/0125023 A1 | 5/2010 | List et al. |
| 2010/0229824 A1 | 9/2010 | Matsuo et al. |
| 2010/0332089 A1 | 12/2010 | Gianone et al. |
| 2011/0000332 A1 | 1/2011 | Gianone et al. |
| 2011/0039657 A1 | 2/2011 | Gibson et al. |
| 2011/0135500 A1 | 6/2011 | Kaimer et al. |
| 2013/0018605 A1 | 1/2013 | Peterson |

FOREIGN PATENT DOCUMENTS

| | | |
|---|---|---|
| DE | 10 2007 004964 A1 | 8/2008 |
| EP | 0515326 | 11/1992 |
| GB | 1471305 | 4/1977 |
| GB | 2 046 376 A | 11/1980 |
| GB | 2402720 | 2/2007 |
| JP | 56-003307 A | 1/1981 |
| JP | 2000337119 A | 5/2000 |
| JP | 2004-067001 | 3/2004 |
| KR | 2005038168 | 4/2005 |
| KR | 10-1039579 B1 | 6/2011 |

OTHER PUBLICATIONS

International Search Report and Written Opinion issued in PCT/US2012/024119, dated Aug. 22, 2012.

International Search Report and Written Opinion issued in PCT/US2012/025451, dated Aug. 27, 2012.

International Search Report and Written Opinion issued in PCT/US2012/025457, dated Dec. 26, 2012.

International Search Report and Written Opinion issued in PCT/US2012/027847, mailed Sep. 26, 2012.

International Search Report and Written Opinion issued in PCT/US2012/043432, dated Oct. 23, 2012.

European Supplemental Search Report for European Patent Application No. 12757971.2 dated Aug. 4, 2014.

* cited by examiner

LOW OIL LEVEL DETECTION SYSTEM AND METHOD

CROSS REFERENCE TO RELATED APPLICATIONS

This application is a continuation of PCT/US2012/043432, filed Jun. 21, 2012, which claims the benefit of U.S. Provisional Application No. 61/499,889 filed Jun. 22, 2011, both of which are hereby incorporated by reference.

BACKGROUND OF THE INVENTION

With the growing concern over global climate change as well as oil supplies, there has been a recent trend to develop various hybrid systems for motor vehicles. While numerous hybrid systems have been proposed, the systems typically require significant modifications to the drive trains of the vehicles. These modifications make it difficult to retrofit the systems to existing vehicles. Moreover, some of these systems have a tendency to cause significant power loss, which in turn hurts the fuel economy for the vehicle. Thus, there is a need for improvement in this field.

One of the areas for improvement is in the construction and arrangement of the hydraulic system. Hybrid vehicles, and in particular the hybrid module associated with such a vehicle, have various lubrication and cooling needs which depend on engine conditions and operational modes. In order to address these needs, oil is delivered by at least one hydraulic pump. The operation of each hydraulic pump is controlled, based in part on the lubrication and cooling needs and based in part on the prioritizing when one or more hydraulic pump is included as part of the hydraulic system of the hybrid vehicle. The prioritizing between hydraulic pumps is based in part on the needs and based in part on the operational state or mode of the hybrid vehicle.

Another area for improvement within the hydraulic system is in the monitoring of engine conditions, settings, and the status of fluid levels. Related to such monitoring is the desire (and ability) to alert the driver (or operator) of the vehicle when a condition, reading, or level is outside of a desired range or deviates from a desired value. As one example, consider a desired oil level (or range) for the vehicle or for some portion or subassembly of the vehicle and the importance of alerting the driver when a low oil condition exists.

SUMMARY

The hydraulic system (and method) described herein is part of a hybrid module used within a hybrid system adapted for use in vehicles and suitable for use in transportation system and into other environments. The cooperating hybrid system is generally a self-contained and self-sufficient system which is able to function without the need to drain resources from other systems in the corresponding vehicle or transportation system. The hybrid module includes an electric machine (eMachine).

This self-sufficient design in turn reduces the amount of modifications needed for other systems, such as the transmission and lubrication systems, because the capacities of the other systems do not need to be increased in order to compensate for the increased workload created by the hybrid system. For instance, the hybrid system incorporates its own lubrication and cooling systems that are able to operate independently of the transmission and the engine. The fluid circulation system, which can act as a lubricant, hydraulic fluid, and/or coolant, includes a mechanical pump for circulating a fluid, along with an electric pump that supplements the workload for the mechanical pump when needed. As will be explained in further detail below, this dual mechanical/electric pump system helps to reduce the size and weight of the required mechanical pump, and if desired, also allows the system to run in a complete electric mode in which the electric pump solely circulates the fluid.

More specifically, the described hydraulic system (for purposes of the exemplary embodiment) is used in conjunction with a hybrid electric vehicle (HEV). Included as part of the described hydraulic system is a parallel arrangement of a mechanical oil pump and an electric oil pump. The control of each pump and the sequence of operation of each pump depends in part on the operational state or the mode of the hybrid vehicle. Various system modes are described herein relating to the hybrid vehicle. As for the hydraulic system disclosed herein, there are three modes which are specifically described and these three modes include an electric mode (EMode), a transition mode, and a cruise mode.

As will be appreciated from the description which follows, the described hydraulic system (and method) is constructed and arranged for addressing the need for component lubrication and for cooling those portions of the hybrid module which experience an elevated temperature during operation of the vehicle. The specific construction and operational characteristics provide an improved hydraulic system for a hydraulic module.

The compact design of the hybrid module has placed demands and constraints on a number of its subcomponents, such as its hydraulics and the clutch. To provide an axially compact arrangement, the piston for the clutch has a recess in order to receive a piston spring that returns the piston to a normally disengaged position. The recess for the spring in the piston creates an imbalance in the opposing surface areas of the piston. This imbalance is exacerbated by the high centrifugal forces that cause pooling of the fluid, which acts as the hydraulic fluid for the piston. As a result, a nonlinear relationship for piston pressure is formed that makes accurate piston control extremely difficult. To address this issue, the piston has an offset section so that both sides of the piston have the same area and diameter. With the areas being the same, the operation of the clutch can be tightly and reliably controlled. The hydraulics for the clutch also incorporate a spill over feature that reduces the risk of hydrostatic lock, while at the same time ensures proper filling and lubrication.

In addition to acting as the hydraulic fluid for the clutch, the hydraulic fluid also acts as a coolant for the eMachine as well as other components. The hybrid module includes a sleeve that defines a fluid channel that encircles the eMachine for cooling purposes. The sleeve has a number of spray channels that spray the fluid from the fluid channel onto the windings of the stator, thereby cooling the windings, which tend to generally generate the majority of the heat for the eMachine. The fluid has a tendency to leak from the hybrid module and around the torque converter. To prevent power loss of the torque converter, the area around the torque converter should be relatively dry, that is, free from the fluid. To keep the fluid from escaping and invading the torque converter, the hybrid module includes a dam and slinger arrangement. Specifically, the hybrid module has a impeller blade that propels the fluid back into the eMachine through a window or opening in a dam member. Subsequently, the fluid is then drained into the sump so that it can be scavenged and recirculated.

The hybrid module has a number of different operational modes. During the start mode, the battery supplies power to the eMachine as well as to the electric pump. Once the electric pump achieves the desired oil pressure, the clutch piston is stroked to apply the clutch. With the clutch engaged, the eMachine applies power to start the engine. During the electro-propulsion only mode the clutch is disengaged, and only the eMachine is used to power the torque converter. In the propulsion assist mode, the engine's clutch is engaged, and the eMachine acts as a motor in which both the engine and eMachine drive the torque converter. While in a propulsion-charge mode, the clutch is engaged, and the internal combustion engine solely drives the vehicle. The eMachine is operated in a generator mode to generate electricity that is stored in the energy storage system. The hybrid module can also be used to utilize regenerative braking (i.e., regenerative charging). During regenerative braking, the engine's clutch is disengaged, and the eMachine operates as a generator to supply electricity to the energy storage system. The system is also designed for engine compression braking, in which case the engine's clutch is engaged, and the eMachine operates as a generator as well.

The described hydraulic system (for purposes of the exemplary embodiment), as explained herein, is constructed and arranged for addressing the need for lubrication and cooling of components, subassemblies, and portions of the hybrid module of the HEV. Related to the need for lubrication and cooling is the importance of having sufficient oil levels and sufficient oil flow, i.e., delivery to the desired locations. When an oil level is not within a desired range or when the oil flow is not sufficient, it is important to have suitable safeguards and warnings so that the oil level or delivery issues can be addressed before serious damage to some portion of the hybrid module occurs.

The low oil level detection system and method described herein provides a system and method for use in alerting the driver of a hybrid motor vehicle when a particular oil level is "low". The relative term "low" is used in the context of the specific hybrid motor vehicle and what may be set or specified by the manufacturer and the desired operating range for the oil level.

As will be appreciated from the description below, the parallel mechanical pump and electric pump arrangement provides an opportunity to use existing system hardware and control systems for alerting the driver of the motor vehicle when the oil level is "low". Since the electric oil pump is used for transient pressurization functions, there are intervals when the electric oil pump is OFF. This allows the electric oil pump to be turned ON, briefly, and then use the pump motor current reading as the basis of the monitoring function.

Further forms, objects, features, aspects, benefits, advantages, and embodiments of the present invention will become apparent from a detailed description and drawings provided herewith.

DETAILED DESCRIPTION

For the purposes of promoting an understanding of the disclosure, reference will now be made to the embodiments illustrated in the drawings and specific language will be used to describe the same. It will nevertheless be understood that no limitation of the scope of the disclosure is thereby intended, such alterations and further modifications in the illustrated device and its use, and such further applications of the principles of the disclosure as illustrated therein being contemplated as would normally occur to one skilled in the art to which the disclosure relates.

Figure 1:
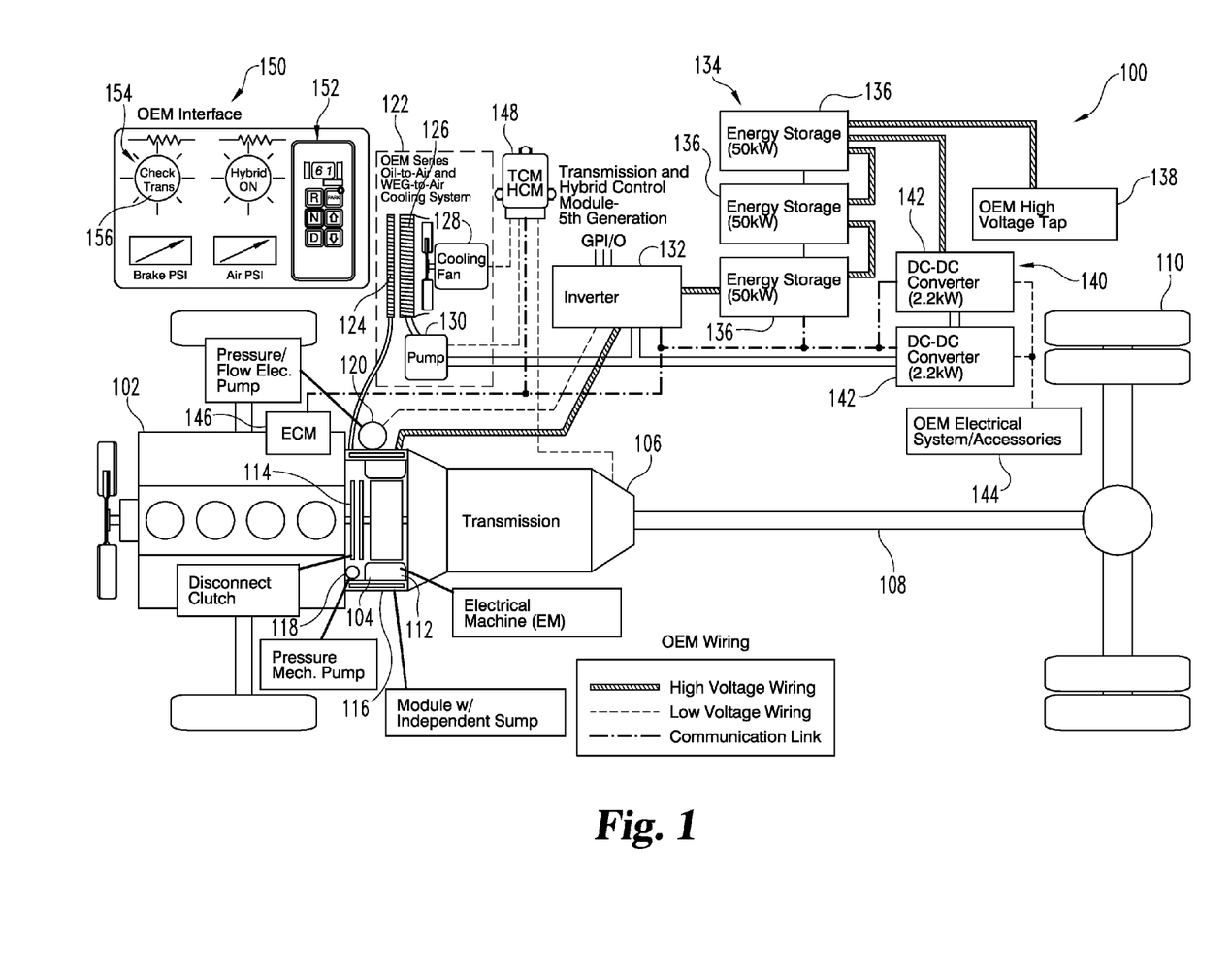
FIG. 1 illustrates a diagrammatic view of one example of a hybrid system.

FIG. 1 shows a diagrammatic view of a hybrid system 100 according to one embodiment. The hybrid system 100 illustrated in FIG. 1 is adapted for use in commercial-grade trucks as well as other types of vehicles or transportation systems, but it is envisioned that various aspects of the hybrid system 100 can be incorporated into other environments. As shown, the hybrid system 100 includes an engine 102, a hybrid module 104, an automatic transmission 106, and a drive train 108 for transferring power from the transmission 106 to wheels 110. The hybrid module 104 incorporates an electrical machine, commonly referred to as an eMachine 112, and a clutch 114 that operatively connects and disconnects the engine 102 with the eMachine 112 and the transmission 106.

The hybrid module 104 is designed to operate as a self-sufficient unit, that is, it is generally able to operate independently of the engine 102 and transmission 106. In particular, its hydraulics, cooling and lubrication do not directly rely upon the engine 102 and the transmission 106. The hybrid module 104 includes a sump 116 that stores and supplies fluids, such as oil, lubricants, or other fluids, to the hybrid module 104 for hydraulics, lubrication, and cooling purposes. While the terms oil or lubricant or lube will be used interchangeably herein, these terms are used in a broader sense to include various types of lubricants, such as natural or synthetic oils, as well as lubricants having different properties. To circulate the fluid, the hybrid module 104 includes a mechanical pump 118 and an electric pump 120 in cooperation with a hydraulic system 200 (see FIG. 2). With this parallel combination of both the mechanical pump 118 and electric pump 120, the overall size and, moreover, the overall expense for the pumps is reduced. The electric pump 120 cooperates with the mechanical pump 118 to provide extra pumping capacity when required. The electric pump 120 is also used for hybrid system needs when there is no drive input to operate the mechanical pump 118. In addition, it is contemplated that the flow through the electric pump 120 can be used to detect low fluid conditions for the hybrid module 104.

As used in the context of this disclosure, the mechanical pump 118 should be thought of as the primary fluid pump given the nature of its use within hybrid module 104 and hybrid system 100. Similarly, the electric pump 120 should be thought of as a secondary fluid pump given the nature of its use. The sump 116 constitutes a fluid reservoir and each pump is constructed and arranged to draw fluid, such as oil, from the sump 116 and deliver at least a portion of that fluid to a location which is downstream from the corresponding pump.

The hybrid system 100 further includes a cooling system 122 that is used to cool the fluid supplied to the hybrid module 104 as well as the water-ethylene-glycol (WEG) to various other components of the hybrid system 100. In one variation, the WEG can also be circulated through an outer jacket of the eMachine 112 in order to cool the eMachine 112. Although the hybrid system 100 has been described with respect to a WEG coolant, other types of antifreezes and cooling fluids, such as water, alcohol solutions, etc., can be used. With continued reference to FIG. 1, the cooling system 122 includes a fluid radiator 124 that cools the fluid for the hybrid module 104. The cooling system 122 further includes a main radiator 126 that is configured to cool the antifreeze for various other components in the hybrid system 100. Usually, the main radiator 126 is the engine radiator in most vehicles, but the main radiator 126 does not need to be the engine radiator. A cooling fan 128 flows air through both fluid radiator 124 and main radiator 126. A circulating or coolant pump 130 circulates the antifreeze to the main radiator 126. It should be recognized that other various components besides the ones illustrated can be cooled using the cooling system 122. For instance, the transmission 106 and/or the engine 102 can be cooled as well via the cooling system 122.

The eMachine 112 in the hybrid module 104, depending on the operational mode, at times acts as a generator and at other times as a motor. When acting as a motor, the eMachine 112 draws alternating current (AC). When acting as a generator, the eMachine 112 creates AC. An inverter 132 converts the AC from the eMachine 112 and supplies it to an energy storage system 134. The eMachine 112 in one example is an HVH410 series electric motor manufactured by Remy International, Inc. of Pendleton, Ind., but it is envisioned that other types of eMachines can be used. In the illustrated example, the energy storage system 134 stores the energy and resupplies it as direct current (DC). When the eMachine 112 in the hybrid module 104 acts as a motor, the inverter 132 converts the DC power to AC, which in turn is supplied to the eMachine 112. The energy storage system 134 in the illustrated example includes three energy storage modules 136 that are daisy-chained together to supply high voltage power to the inverter 132. The energy storage modules 136 are, in essence, electrochemical batteries for storing the energy generated by the eMachine 112 and rapidly supplying the energy back to the eMachine 112. The energy storage modules 136, the inverter 132, and the eMachine 112 are operatively coupled together through high voltage wiring as is depicted by the line illustrated in FIG. 1. While the illustrated example shows the energy storage system 134 including three energy storage modules 136, it should be recognized that the energy storage system 134 can include more or less energy storage modules 136 than is shown. Moreover, it is envisioned that the energy storage system 134 can include any system for storing potential energy, such as through chemical means, pneumatic accumulators, hydraulic accumulators, springs, thermal storage systems, flywheels, gravitational devices, and capacitors, to name just a few examples.

High voltage wiring connects the energy storage system 134 to a high voltage tap 138. The high voltage tap 138 supplies high voltage to various components attached to the vehicle. A DC-DC converter system 140, which includes one or more DC-DC converter modules 142, converts the high voltage power supplied by the energy storage system 134 to a lower voltage, which in turn is supplied to various systems and accessories 144 that require lower voltages. As illustrated in FIG. 1, low voltage wiring connects the DC-DC converter modules 142 to the low voltage systems and accessories 144.

The hybrid system 100 incorporates a number of control systems for controlling the operations of the various components. For example, the engine 102 has an engine control module (ECM) 146 that controls various operational characteristics of the engine 102 such as fuel injection and the like. A transmission/hybrid control module (TCM/HCM) 148 substitutes for a traditional transmission control module and is designed to control both the operation of the transmission 106 as well as the hybrid module 104. The transmission/hybrid control module 148 and the engine control module 146 along with the inverter 132, energy storage system 134, and DC-DC converter system 140 communicate along a communication link as is depicted in FIG. 1.

To control and monitor the operation of the hybrid system 100, the hybrid system 100 includes an interface 150. The interface 150 includes a shift selector 152 for selecting whether the vehicle is in drive, neutral, reverse, etc., and an instrument panel 154 that includes various indicators 156 of the operational status of the hybrid system 100, such as check transmission, brake pressure, and air pressure indicators, to name just a few.

As noted before, the hybrid system 100 is configured to be readily retrofitted to existing vehicle designs with minimal impact to the overall design. All of the systems including, but not limited to, mechanical, electrical, cooling, controls, and hydraulic systems, of the hybrid system 100 have been configured to be a generally self-contained unit such that the remaining components of the vehicle do not need significant modifications. The more components that need to be modified, the more vehicle design effort and testing is required, which in turn reduces the chance of vehicle manufacturers adopting newer hybrid designs over less efficient, preexisting vehicle designs. In other words, significant modifications to the layout of a preexisting vehicle design for a hybrid retrofit require, then, vehicle and product line modifications and expensive testing to ensure the proper operation and safety of the vehicle, and this expense tends to lessen or slow the adoption of hybrid systems. As will be recognized, the hybrid system 100 not only incorporates a mechanical architecture that minimally impacts the mechanical systems of pre-existing vehicle designs, but the hybrid system 100 also incorporates a control/electrical architecture that minimally impacts the control and electrical systems of pre-existing vehicle designs.

Figure 2:
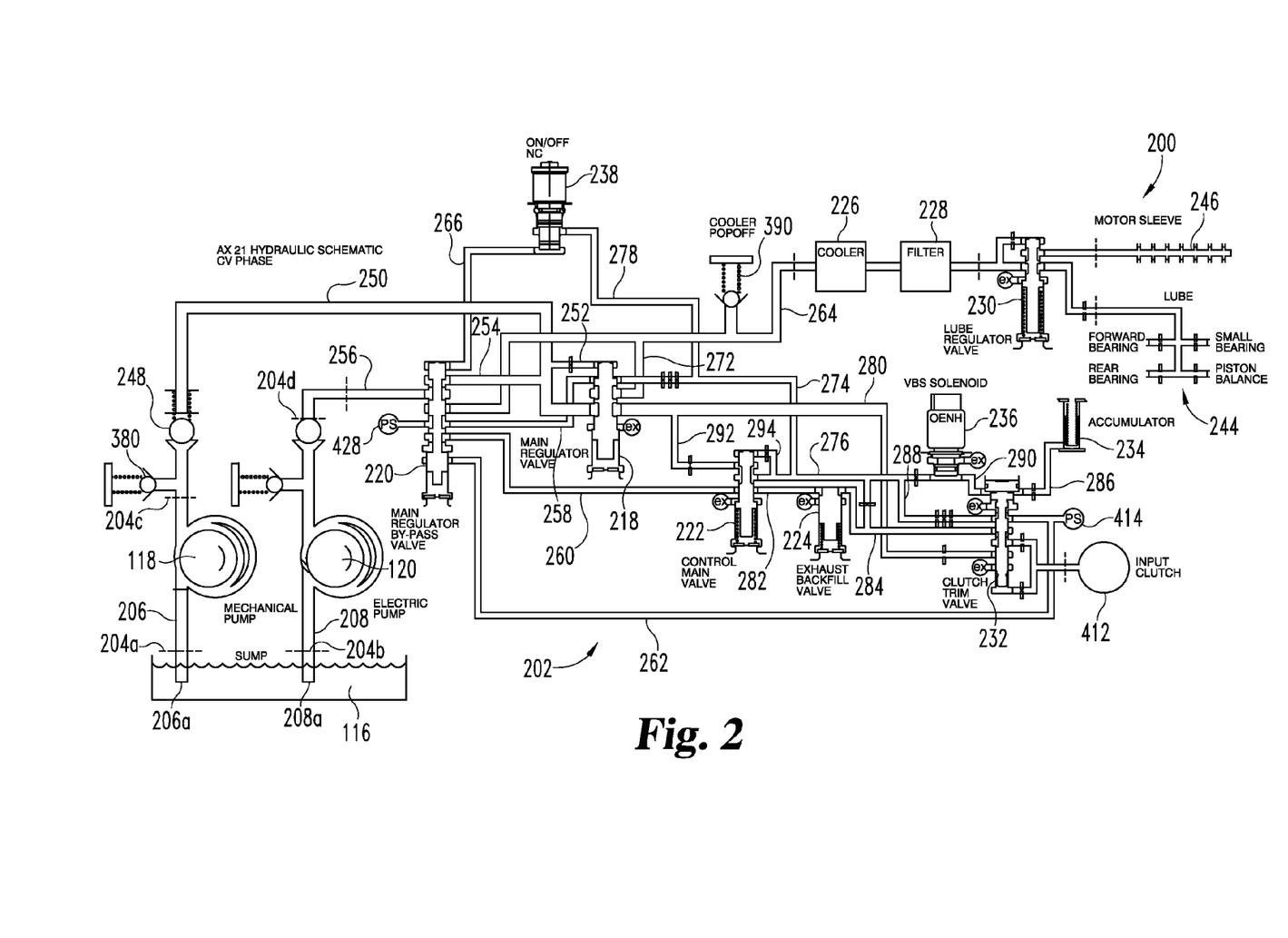
FIG. 2 illustrates a diagrammatic view of one hydraulic system suitable for use in the FIG. 1 hybrid system.

Referring to FIG. 2, there is illustrated in diagrammatic form a hydraulic system 200 which is suitably constructed and arranged for use with hybrid system 100. More particularly, hydraulic system 200 is a portion of hybrid module 104. Since the FIG. 2 illustration includes components which interface with a sump module assembly 202, broken lines 204 are used in FIG. 2 to denote, in diagrammatic form, the functional locations of the oil connections from other hydraulic components to the sump module assembly 202. Lower case letters are used in conjunction with reference numeral 204 in order to distinguish the various broken line locations (204a, 204b, etc.). For example, the sump 116 is part of the sump module assembly 202, while mechanical pump 118 and electric pump 120 are not technically considered to be actual component parts of the sump module assembly 202, through this convention is somewhat arbitrary. The mechanical pump 118 and the electric pump 120 each have an oil connection with the sump module assembly 202. Sump 116 is independent of the sump for the automatic transmission 106. Broken line 204a diagrammatically illustrates the location of flow communication between the mechanical pump inlet conduit 206 and sump 116. Similarly, broken line 204b denotes the location of flow communication between the electric pump inlet conduit 208 and sump 116. Inlet conduit 206 defines inlet conduit opening 206a. This fluid inlet 206a can also be considered as the fluid inlet of the mechanical pump 118. Inlet conduit 208 defines inlet conduit opening 208a. This fluid inlet 208a can also be considered as the fluid inlet of the electric pump 120.

On the flow exiting sides of the two oil pumps, broken line 204c denotes the location where the outlet 210 of mechanical pump 118 is in flow connection (and flow communication with the sump module assembly 202. Broken line 204d denotes the location where the outlet 212 of the electric pump 120 is in flow connection (and flow communication) with the sump module assembly 202. This broken line convention is used throughout the FIG. 2 illustration. However, this convention is simply for convenience in explaining the exemplary embodiment and is not intended to be structurally limiting in any manner. While the other components which have flow connections to the sump module assembly 202 are not technically considered part of the sump module assembly, these other components, such as the mechanical pump 118 and the electric pump 120, are considered part of the overall hydraulic system 200.

With continued referenced to FIG. 2, hydraulic system 200 includes a main regulator valve 218, main regulator by-pass valve 220, control main valve 222, exhaust back fill valve 224, cooler 226, filter 228, lube splitter valve 230, clutch trim valve 232, accumulator 234, solenoid 236, and solenoid 238. It will be appreciated that these identified component parts and subassemblies of hydraulic system 200 are connected with various flow conduits and that pop off valves are strategically positioned to safeguard against excessive pressure levels. Further, downstream from the lube splitter valve 230 are illustrated elements which are intended to receive oil. The first priority of the available oil at the lube splitter valve 230 is for lubrication and cooling of bearings 244 and gears or other accessories which are in need of cooling and lubrication. The second priority, once the first priority has been satisfied, is to deliver oil to motor sleeve 246.

The mechanical pump 118 is constructed and arranged to deliver oil to the main regulator valve 218 via conduit 250. One-way valve 248 is constructed and arranged for flow communication with conduit 250 and is positioned downstream from the mechanical pump 118. Valve 248 is constructed and arranged to prevent backwards flow when the engine and (accordingly) the mechanical pump are OFF. Valve 248 includes a ball and spring arrangement set at a threshold of 5 psi. Branch conduits 252 and 254 provide flow connections to the main regulator valve 218 and the main regulator by-pass valve 220, respectively. The electric pump 120 is constructed and arranged to deliver oil to the main regulator by-pass valve 220 via conduit 256. The main regulator by-pass valve 220 is in flow communication with main regulator valve 218 via conduit 258, with control main valve 222 via conduit 260, with clutch trim valve 232 via conduit 262, with cooler 226 via conduit 264 and with solenoid 238 via conduit 266.

The main regulator valve 218 is in flow communication with conduit 264 via conduit 272. Conduit 274 is in flow communication with the main regulator valve 218 and connects to conduit 276 which extends between control main valve 222 and solenoid 236. Branch conduit 278 establishes a flow path between conduit 274 and solenoid 238. Conduit 280 establishes flow communication between main regulator valve 218 and clutch trim valve 232. Conduit 282 establishes flow communication between control main valve 222 and exhaust back fill valve 224. Conduit 284 establishes flow communication between exhaust back fill valve 224 and clutch trim valve 232. Conduit 286 establishes flow communication between clutch trim valve 232 and accumulator 234. Conduit 288 establishes flow communication between clutch trim valve 232 and conduit 276. Conduit 290 establishes flow communication between solenoid 236 and clutch trim valve 232. Conduit 292 establishes a flow path (main) between conduit 280 and control main valve 222. Conduit 294 establishes a control branch flow connection between conduit 276 and control main valve 222. Other flow connections and conduits are illustrated in FIG. 2 and the corresponding flow path is readily apparent.

Considering the diagrammatic form of FIG. 2, it will be appreciated that the various flow connections and flow conduits may assume any one of a variety of forms and constructions so long as the desired oil flow can be achieved with the desired flow rate and the desired flow timing and sequence. The hydraulic system 200 description makes clear what type of oil flow is required between what components and subassemblies and the operational reason for each flow path. The hydraulic system 200 description which corresponds to what is illustrated in FIG. 2 is directed to what components and subassemblies are in oil flow communication with each other, depending on the hybrid system 100 conditions and the operational mode.

Figure 3:
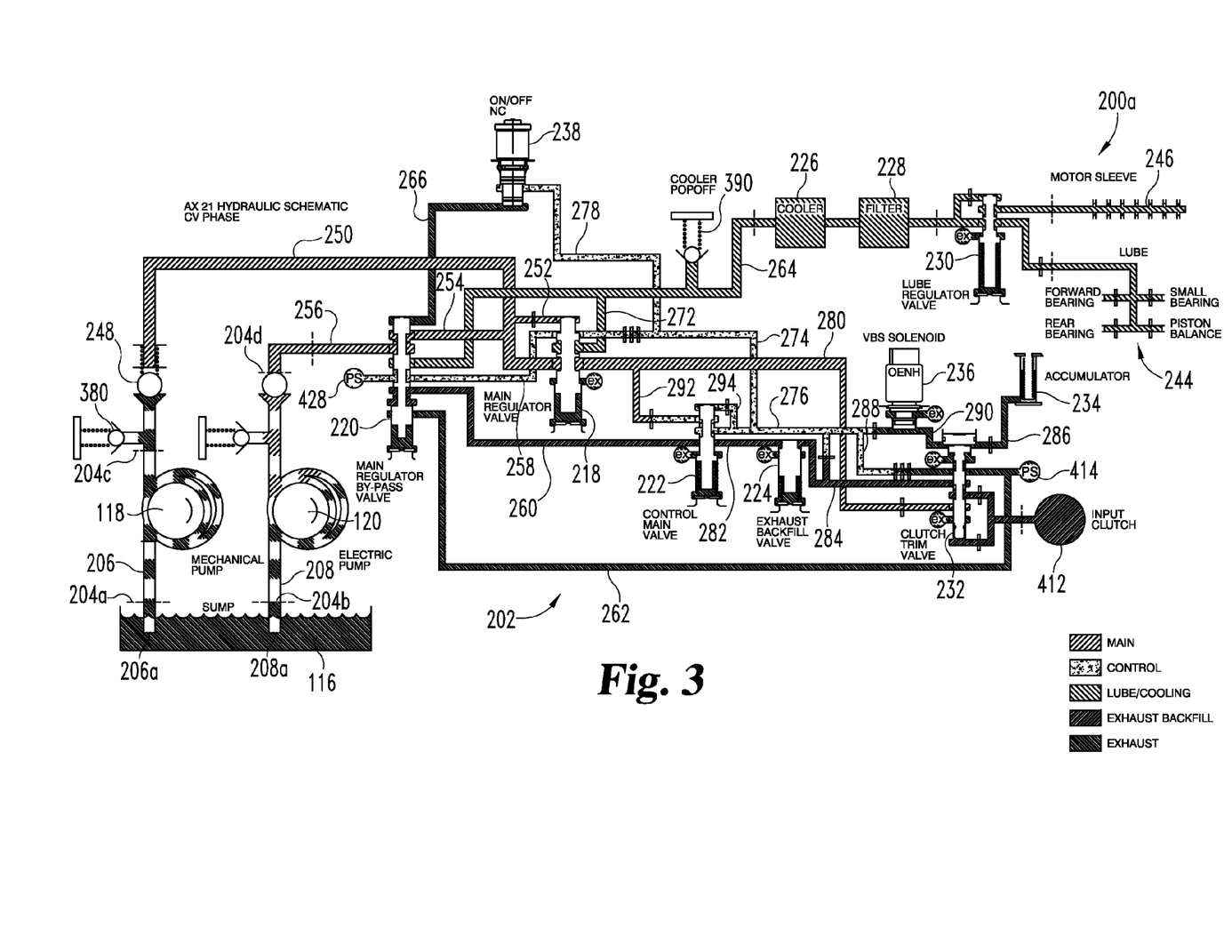
FIG. 3 illustrates a diagrammatic view of the FIG. 2 hydraulic system when the hydraulic system is in an eMode.
Figure 4:
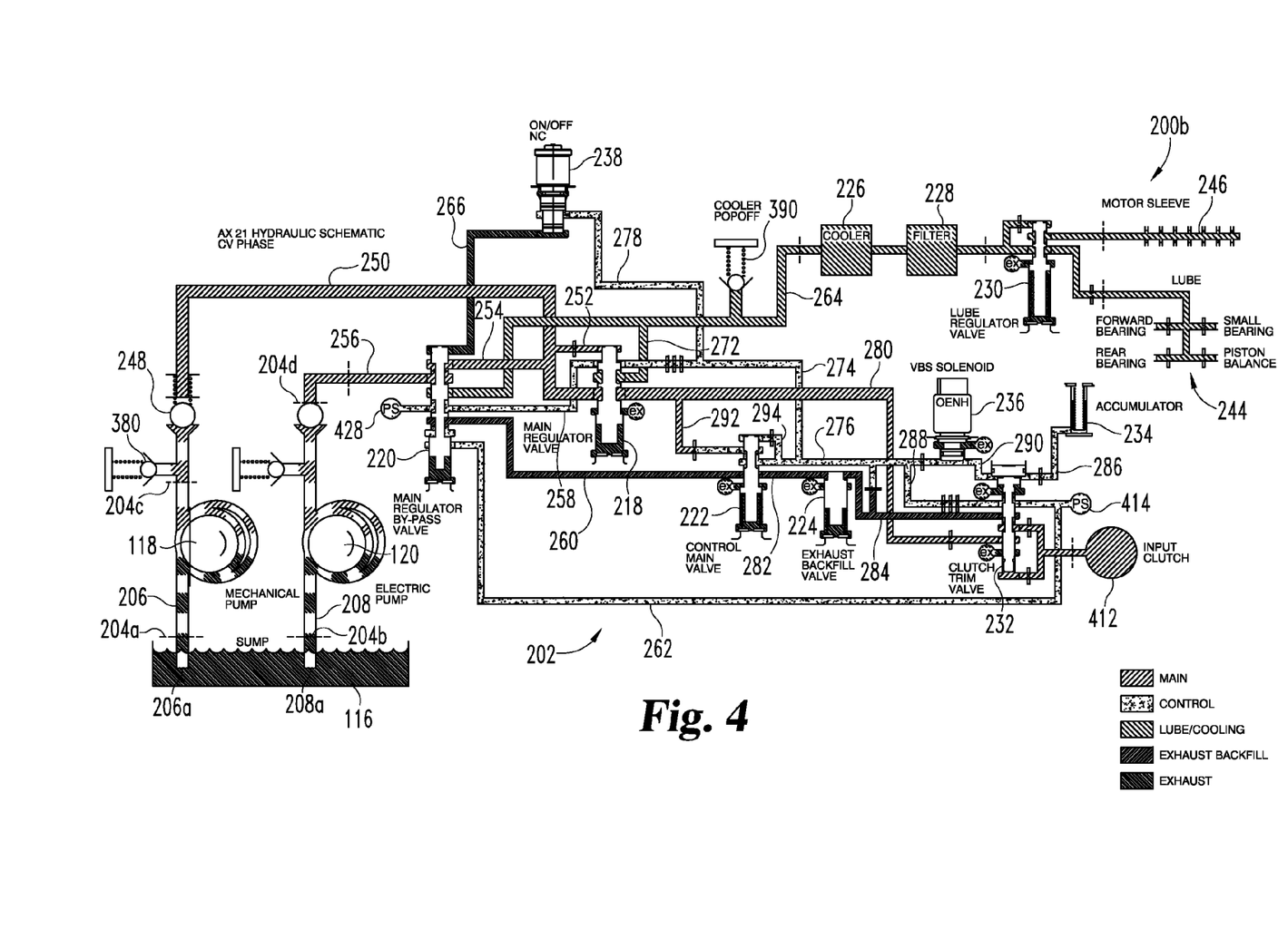
FIG. 4 illustrates a diagrammatic view of the FIG. 2 hydraulic system when the hydraulic system is in a Transition Mode.
Figure 5:
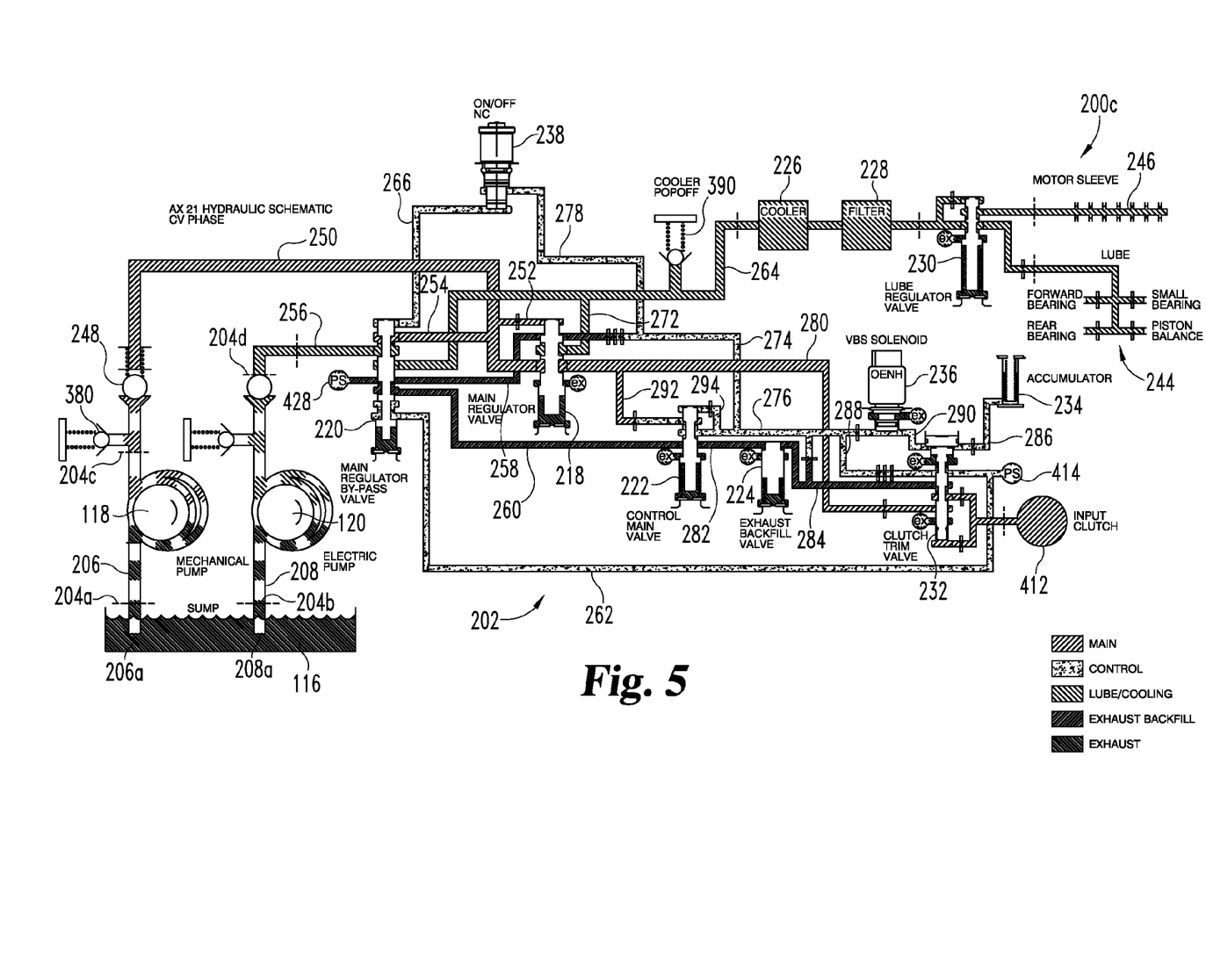
FIG. 5 illustrates a diagrammatic view of the FIG. 2 hydraulic system when the hydraulic system is in a Cruise Mode.

The described hydraulic system 200 and its three (principal) operational modes are further explained in the context of FIGS. 3, 4, and 5. These three modes include an electric mode (eMode), a transition mode, and a cruise mode.

Referring first to FIG. 3, in the eMode condition, as represented by hydraulic system 200a, the engine and clutch are each in an "OFF" condition, and each solenoid 236 and 238 is an "OFF" condition. The electric pump 120 provides one hundred percent (100%) of the oil flow to the main regulator valve 218. With solenoid 238 in an "OFF" condition, there is no solenoid signal to the main regulator by-pass valve 220 and this component is also considered as being in an "OFF" condition. The main pressure is "knocked down" to 90 psi due to using only the electric pump 120 and considering its performance limitations. Any lube/cooling flow to the cooler 226 is the result of main regulator valve 218 overage.

Referring now to FIG. 4, in the Transition Mode condition as represented by hydraulic system 200b, the engine may be in either an "ON" or "OFF" condition, the clutch is in an "ON" condition, solenoid 238 is "OFF", and solenoid 236 is "ON". The electric pump 120 and the mechanical pump 118 can supply a flow of oil to the main regular valve 218. The main pressure is knocked down to 90 psi and any lube/cooling flow to the cooler 226 is the result of main regulator valve 218 overage.

Referring now to FIG. 5, in the Cruise Mode as represented by hydraulic system 200c, the engine and clutch are each in an "ON" condition, and each solenoid 236 and 238 is an "ON" condition. In this condition, the mechanical pump 118 provides one hundred percent (100%) of the oil flow to the main regulator valve 218 and to the clutch control hydraulics. The electric pump 120 provides supplemental cooler flow (or what may be referred to as cooler flow "boost"). The main pressure is at the "normal" (i.e., not knocked down) level of 205 psi. The flow to the cooler 226 is by way of the main regulator valve 218 overage and supplemented by flow from the electric pump 120.

The three modes which have been described and illustrated in FIGS. 3-5 have been identified in conjunction with hydraulic systems 200a, 200b, and 200c, respectively. This numbering scheme of letter suffixes is representative of the fact that the hardware, components, subassemblies, and conduits of hydraulic system 200 do not change with the different modes of operation. However, the operational status, the various ON/OFF conditions, etc. of the hardware, components, and subassemblies may change, depending on the particular item and the specific mode of operation.

While the three described modes for the hydraulic system 200 are based in part on the status or conditions of the engine, these modes are also based in part on the ON/OFF status of the referenced hardware, components, and subassemblies, including the mechanical pump 118 and the electric pump 120. The mechanical pump 118 is directly connected to the engine 102 such that when the engine is ON, the mechanical pump 118 is ON. When the engine 102 is OFF, the mechanical pump 118 is OFF. When ON, the mechanical pump 118 delivers oil to the entire hydraulic system. Any overage from the main regulator valve 218 is delivered to the cooler 226.

The ON/OFF status of the electric pump 120 and the speed of the electric pump 120 are controlled by the electronics of the hybrid module 104. The electric pump 120 delivers oil either to the hydraulic system 200 and/or to the cooler 226. When the mechanical pump 118 is either OFF or when its delivery of oil is insufficient, the electric pump 120 delivers oil to the hydraulic system. When the delivery of oil from the mechanical pump is sufficient, the electric pump 120 is able to be used for delivery of oil to the cooler for lube and motor cooling.

Reference has been made to the knocked down lower pressure level for certain operational modes. This knocked down pressure is associated with operation of the electric pump 120. Considering the various pressure levels and flow rates, the main pressure of the mechanical pump 118 is 205 psi. The main pressure of the electric pump 120 is 90 psi. For lube and cooling, the first 5.0 lpm of flow at approximately 30 psi is used for lube. Any excess flow up to approximately 15.0 lpm is delivered to the motor cooling sleeve 246. A maximum of 50 psi for the lube/cooling function is attained only after the motor cooling sleeve 240 is filled with oil. The clutch applied pressure is 205 psi nominal (1410 kPa) and 188 psi minimum (1300 kPa).

Figure 6:
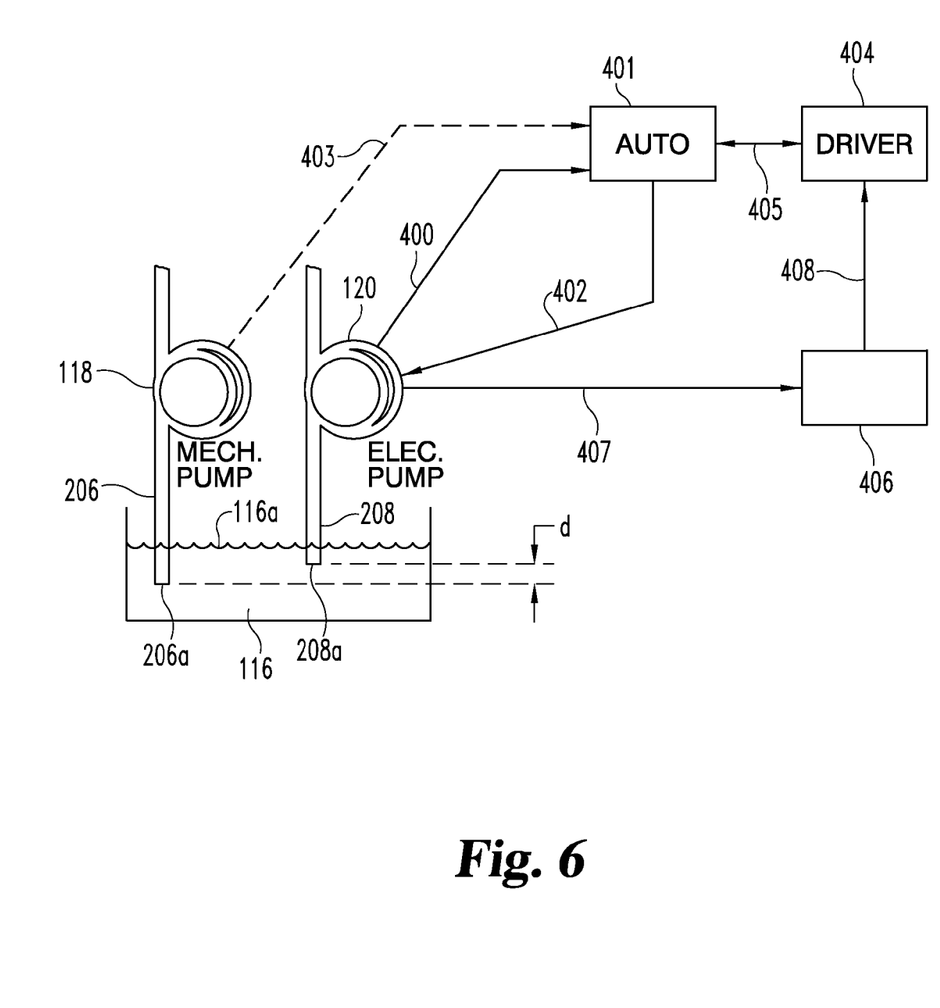
FIG. 6 is a schematic illustration depicting an exemplary embodiment of a low oil level detection system and the related logic signal connections.

Referring now to FIG. 6, a schematic illustration is provided as a way to depict the exemplary embodiment of the low oil level detection system and the logic relating to the method of detection. Focusing first on the mechanical pump 118 and the electric pump 120 and their relationship to sump 116, each pump includes a flow inlet conduit 206 and 208, respectively. Each inlet conduit is constructed and arranged in flow communication with sump 116 and these components are all part of hybrid module 104.

In the schematic illustration of FIG. 6, the sump 116 is constructed and arranged in a generally horizontal orientation tending to be consistent with the vehicle orientation as typically travelling over a generally horizontal road surface. In this orientation, the mechanical pump inlet conduit 206 is constructed and arranged in a generally vertical orientation as extends into the interior volume of sump 116. Similarly, the electric pump inlet conduit 208 is constructed and arranged in a generally vertical orientation as it extends into the interior volume of sump 116. For the purposes of the described low oil level detection system and method, the mechanical pump inlet conduit opening 206a (i.e., the fluid inlet of the mechanical pump) is positioned in the interior volume of sump 116 axially below the electric pump inlet conduit opening 208a, (i.e., the fluid inlet of the electric pump). The axial offset distance or separation dimension between the two conduit openings 206a and 208a is approximately 0.5 inches (12.7 mm) for the envisioned size and shape of sump 116 of the exemplary embodiment. However, as the characteristics of sump 116 might change depending on the particular HEV and the particular hybrid module 104, this offset or separation distance between openings could change, as will be appreciated from an understanding of the described low oil level detection system and method. This offset distance between the two conduit openings is identified by reference letter "d" in FIG. 6. It is also important to have a suitable side-to-side spacing between inlet conduits 206 and 208.

The sump 116 retains a supply of fluid whose volume will vary over time and will vary with operation of the hybrid module 104. The upper surface 116a of this supply of fluid is the reference surface for the depth of the two conduit openings (i.e., the fluid inlet 206a of the mechanical pump 118 and the fluid inlet 208a of the electric pump 120). Under normal conditions, the upper surface 116a will be above each fluid inlet 206a, 208a. As explained, fluid inlet 208a is not as deep or as far down into the supply of fluid as fluid inlet 206a and as such fluid inlet 208a is thus closer to the upper surface 116a and is actually between that upper surface and fluid inlet 206a.

During a condition (refer to the three operational modes) when the electric pump 120 is an OFF status or condition, a command is sent to turn on the electric pump 120, only briefly. Once the electric pump 120 is turned to an ON condition, the pump motor current is monitored (i.e., read and relayed). Data line 400 is constructed and arranged to provide information to monitoring module 401 regarding the ON/OFF status of the electric pump 120. The monitoring module 401 is constructed and arranged to send a "turn on" signal (data line 402) to the electric pump 120 only when the electric pump 120 is OFF. It is envisioned that monitoring module 401 will be constructed and arranged to automatically and periodically run this low oil level check, based on the length of time the hybrid module has been operating between monitoring checks. Another option would simply be to use an elapsed time between monitoring checks, regardless of whether the hybrid module has been operating. A still further option for the automatic timing of these periodic monitoring checks is to use the length of time the mechanical pump has been operating between monitoring checks. This option is represented by data line 403.

One option for running these described oil level monitoring checks is to allow the driver (or operator) of the vehicle (driver-control block 404) to decide when to run the oil level check. Data line 405 provides the driver with information as to when the last monitoring check was run and whether that check was run as an automatic monitoring check or run as a driver-initiated monitoring check. If the driver elects to run an oil level monitoring check, then that command is sent across data line 405 to monitoring module 401 which runs the check and resets its programmed time interval for periodic (automatic) oil level checks.

As one example of how the time delay and driver involvement may occur, assume that monitoring module 401 is programmed to automatically run an oil level check every eight (8) hours of mechanical pump 118 operation. While this time interval can be set at virtually any value, eight (8) hours is being used for this example. If six (6) hours have elapsed since the last oil level check, two (2) hours of mechanical pump 118 run time remain before the next scheduled monitoring check. While this next scheduled monitoring check would be run automatically and the driver advised of the results, the driver may decide to go ahead and run an oil level monitoring check and not wait for the additional two (2) hours to run. If the driver proceeds to run his own oil level monitoring check, the driver's instruction is sent to monitoring module 401 via data line 405. The monitoring module responds by running the monitoring check and, at the same time, resetting the eight (8) hour interval back to zero and then resumes the count.

If, while in the automatic mode, the end of the eight (8) hour interval is reached and the electric pump 120 is not in an OFF condition, then monitoring module 401 goes into a pending status, waiting for the electric pump 120 to switch to an OFF condition. As soon as the electric pump 120 communicates to the monitoring module 401 via data line 400 that the electric pump is OFF, the monitoring check is run and the eight (8) hour interval count is reset and the countdown resumes. The timer circuitry for this eight (8) hour interval was not in a counting or timing mode while the monitoring module 401 was in the pending status. The same method of operation is applicable in the event the driver sends a command to the monitoring module 401 to run a low oil check. If the electric pump 120 is not in an OFF condition, then the monitoring module 401 goes into the described pending status. However, the driver (driver control block 401) includes an indicator lamp which illuminates when the electric pump is ON. This allows the driver to either wait on authorizing the monitoring check or sending the signal, knowing that the monitoring module 401 will go into a pending status.

When the low oil level monitoring check is run, meaning that all conditions are satisfied, the electric pump is turned on, briefly. If the conduit opening 208a is submerged in oil, then the load (i.e., the mechanical resistance) on the electric pump to draw up oil and pump it to a downstream location yields a particular and corresponding current draw on the electric pump motor. This current draw or level is read by current sensor 406 via data line 407. It will be known that a current level within a predetermined range is indicative of a full pumping load which in turn is indicative of the conduit opening 208a being fully submerged in oil within the interior volume of sump 116. In turn, this means that the oil level in the sump is acceptable (i.e., not a "low" oil level). The actual current reading is sent to the driver via data line 408 as well as an indication of whether the sump oil level is or is not within the preset range. If the sump oil level is low, a warning light and message are provided to the driver. Thus, the driver has an opportunity to address the low oil condition before some type of catastrophic failure or damage occurs. If the sump oil level is "low" such that the conduit opening 208a is either completely out of the oil or at the surface of the oil, then the current draw of the electric pump motor will be lower than that when the conduit opening 208a is fully submerged in oil. Again, by preliminary testing and trial monitoring, the current draw corresponding to a low oil level will be known and a threshold current level set. If the oil level is "low", the driver is advised.

As would be understood, the weight and viscosity of oil are higher than that of air and higher than that of an air and oil mixture. This means that the electric pump 120 motor does less work if it is only drawing in air (opening 208a is out of the oil). The electric pump 120 motor also does less work if it is drawing in a mixture of air and oil (opening 208a is adjacent the surface of the oil). When the electric pump does less work, there is less current draw and this can be monitored as a way to detect if there is a low oil level in the sump 116. A low motor current is an indication of a low or insufficient oil level in the sump 116 of the hybrid module 104. This described system and method does not require the addition of an oil level sensor in the sump 116. Since a low oil level in the sump is able to be monitored without requiring the addition of an oil level sensor, there is a cost savings with this feature.

While the preferred embodiment of the invention has been illustrated and described in the drawings and foregoing description, the same is to be considered as illustrative and not restrictive in character, it being understood that all changes and modifications that come within the spirit of the invention are desired to be protected.

The invention claimed is:

1. A low level detection system for a fluid reservoir of a vehicle, said low level detection system comprising:
    a supply of fluid retained in said fluid reservoir, said supply of fluid having an upper surface which defines the depth of said supply of fluid;
    a primary fluid pump having a fluid inlet and being constructed and arranged for drawing fluid from said fluid reservoir and delivering at least a portion of said fluid to a location which is downstream from said primary fluid pump, wherein the fluid inlet of said primary fluid pump is positioned in said fluid reservoir at a first depth relative to said upper surface;
    a secondary fluid pump having a fluid inlet and being constructed and arranged for drawing fluid from said fluid reservoir and delivering at least a portion of said fluid to a location which is downstream from said secondary fluid pump, said secondary fluid pump having an ON operational state and an OFF operational state, wherein the fluid inlet of said secondary fluid pump is positioned in said fluid reservoir at a second depth relative to said upper surface, wherein when said supply of fluid is sufficient to cover the fluid inlet of said secondary fluid pump, the fluid inlet of said secondary fluid pump is closer to said upper surface than is the fluid inlet of said primary fluid pump;
    monitoring and control means constructed and arranged for monitoring the operational state of said secondary fluid pump and for switching an OFF operational state of said secondary fluid pump to an ON operational state for said secondary fluid pump; and
    sensor means constructed and arranged for reading the current draw of said secondary fluid pump when in said ON operational state.

2. The low level detection system of claim 1 wherein said fluid is oil.

3. The low level detection system of claim 2 wherein the fluid reservoir is an oil sump.

4. The low level detection system of claim 3 wherein said primary fluid pump is a mechanical pump.

5. The low level detection system of claim 4 wherein said secondary fluid pump is an electric pump.

6. The low level detection system of claim 5 wherein said vehicle is a hybrid electric vehicle.

7. The low level detection system of claim 6 wherein said monitoring and control means is connected to said secondary fluid pump by a data line.

8. The low level detection system of claim 7 wherein said sensor means is connected to said secondary fluid pump by a data line.

9. The low level detection system of claim 8 wherein said sensor means is a current sensor of the current draw on said secondary fluid pump.

10. The low level detection system of claim 9 wherein said monitoring and control means is connected to said primary fluid pump by a data line.

11. The low level detection system of claim 1 wherein said primary fluid pump is a mechanical pump and said secondary fluid pump is an electric pump.

12. The low level detection system of claim 1 wherein said monitoring and control means is connected to said secondary fluid pump by a data line.

13. The low level detection system of claim 1 wherein said sensor means is connected to said secondary fluid pump by a data line.

14. The low level detection system of claim 1 wherein said sensor means is a current sensor of the current draw on said secondary fluid pump.

15. The low level detection system of claim 1 wherein said monitoring and control means is connected to said primary fluid pump by a data line.

16. A low level detection system for a fluid reservoir, said low level detection system comprising:
   a supply of fluid retained in said fluid reservoir;
   a primary fluid pump having a fluid inlet and being constructed and arranged for drawing fluid from said fluid reservoir and delivering at least a portion of said fluid to a location which is downstream from said primary fluid pump;
   a secondary fluid pump having a fluid inlet and being constructed and arranged for drawing fluid from said fluid reservoir and delivering at least a portion of said fluid to a location which is downstream from said secondary fluid pump, said secondary fluid pump having an ON operational state and an OFF operational state;
   monitoring and control means constructed and arranged for enabling the detecting of a low fluid level in said fluid reservoir by monitoring the operational state of said secondary fluid pump and by periodically switching an OFF operational state of said secondary fluid pump to an ON operational state for said secondary fluid pump for enabling the detecting of the fluid level in said fluid reservoir; and
   sensor means constructed and arranged for reading the current draw of said secondary fluid pump when in said ON operational state.

17. The low level detection system of claim 16 wherein said primary fluid pump is a mechanical pump and said secondary fluid pump is an electric pump.

18. The low level detection system of claim 16 wherein said sensor means is connected to said secondary fluid pump by a data line.

19. The low level detection system of claim 16 wherein said sensor means is a current sensor of the current draw on said secondary fluid pump.

20. A low level detection system for a fluid reservoir, said low level detection system comprising:
   a supply of fluid retained in said fluid reservoir;
   a primary fluid pump having a fluid inlet and being constructed and arranged for drawing fluid from said fluid reservoir and delivering at least a portion of said fluid to a location which is downstream from said primary fluid pump;
   a secondary fluid pump having a fluid inlet and being constructed and arranged for drawing fluid from said fluid reservoir and delivering at least a portion of said fluid to a location which is downstream from said secondary fluid pump, said secondary fluid pump having an ON operational state and an OFF operational state;
   monitoring and control means constructed and arranged for monitoring the operational state of said secondary fluid pump and for switching an OFF operational state of said secondary fluid pump to an ON operational state for said secondary fluid pump for enabling the detecting of the fluid level in said fluid reservoir; and
   sensor means constructed and arranged for reading the current draw of said secondary fluid pump when in said ON operational state, wherein said primary fluid pump is a mechanical pump and said secondary fluid pump is an electric pump.

21. The low level detection system of claim 20 wherein said sensor means is connected to said secondary fluid pump by a data line.

22. The low level detection system of claim 20 wherein said sensor means is a current sensor of the current draw on said secondary fluid pump.

* * * * *